United States Patent [19]
Flinner et al.

[11] 3,929,150
[45] Dec. 30, 1975

[54] SILLCOCK INCORPORATING AN ANTISIPHON AND BACKFLOW PREVENTER

[75] Inventors: Vaughn D. Flinner, Big Prairie; Richard W. Sprang, Lakeville, both of Ohio

[73] Assignee: Mansfield Sanitary Inc., Perrysville, Ohio

[22] Filed: Oct. 9, 1974

[21] Appl. No.: 513,339

[52] U.S. Cl. ............................. 137/218; 137/523
[51] Int. Cl.² ........................................ F16K 24/02
[58] Field of Search ......... 251/82, 83, 85, 333, 354; 137/DIG. 2, 301, 302, 360, 522, 523

[56] References Cited
UNITED STATES PATENTS

| | | | |
|---|---|---|---|
| 372,503 | 11/1887 | Wheeler | 251/83 |
| 1,422,444 | 7/1922 | Howland | 137/217 |
| 1,959,336 | 5/1934 | Bast et al. | 137/DIG. 2 |
| 2,188,761 | 1/1940 | Peterson et al. | 137/217 X |
| 2,952,270 | 9/1960 | Fulton et al. | 137/360 |
| 3,077,896 | 2/1963 | Weingard | 251/333 X |
| 3,186,430 | 6/1965 | Koutnik | 251/333 X |
| 3,494,373 | 2/1970 | Horak et al. | 137/360 X |
| 3,552,432 | 1/1971 | Wagner | 137/523 |
| 3,589,397 | 6/1971 | Wagner | 137/523 X |

FOREIGN PATENTS OR APPLICATIONS

| | | | |
|---|---|---|---|
| 1,252,024 | 12/1960 | France | 251/83 |

*Primary Examiner*—Henry T. Klinksiek
*Attorney, Agent, or Firm*—Hamilton, Renner & Kenner

[57] ABSTRACT

Disclosed is an improved sillcock valving mechanism that employs a valving element carried on a piston that is slidably mounted on a valve stem and a valve seat engageable by the valving element. A handle is operated to close the sillcock and to open the sillcock. Normal line pressure holds the valving mechanism open, when so permitted by the position of the valve stem, but when the line pressure drops below a predetermined value a spring that applies continuous biasing pressure on the piston forces the valving element into sealing engagement with the valve seat (irrespective of the position of the valve stem) to prevent backflow through the sillcock and into the supply line. A second valving mechanism controls communication between the first passageway and a second passageway which extends within the valve stem and opens to atmosphere. The second valving mechanism opens to preclude siphoning in response to that closure of the first valving mechanism effected by the pressure of the fluid supply line dropping below a predetermined value. Because the piston is rotatable with respect to the valve stem, relative rotation between the valving element and the valve seat is precluded with an attendant reduction in deleterious wear to the valving element.

8 Claims, 4 Drawing Figures

U.S. Patent Dec. 30, 1975 3,929,150
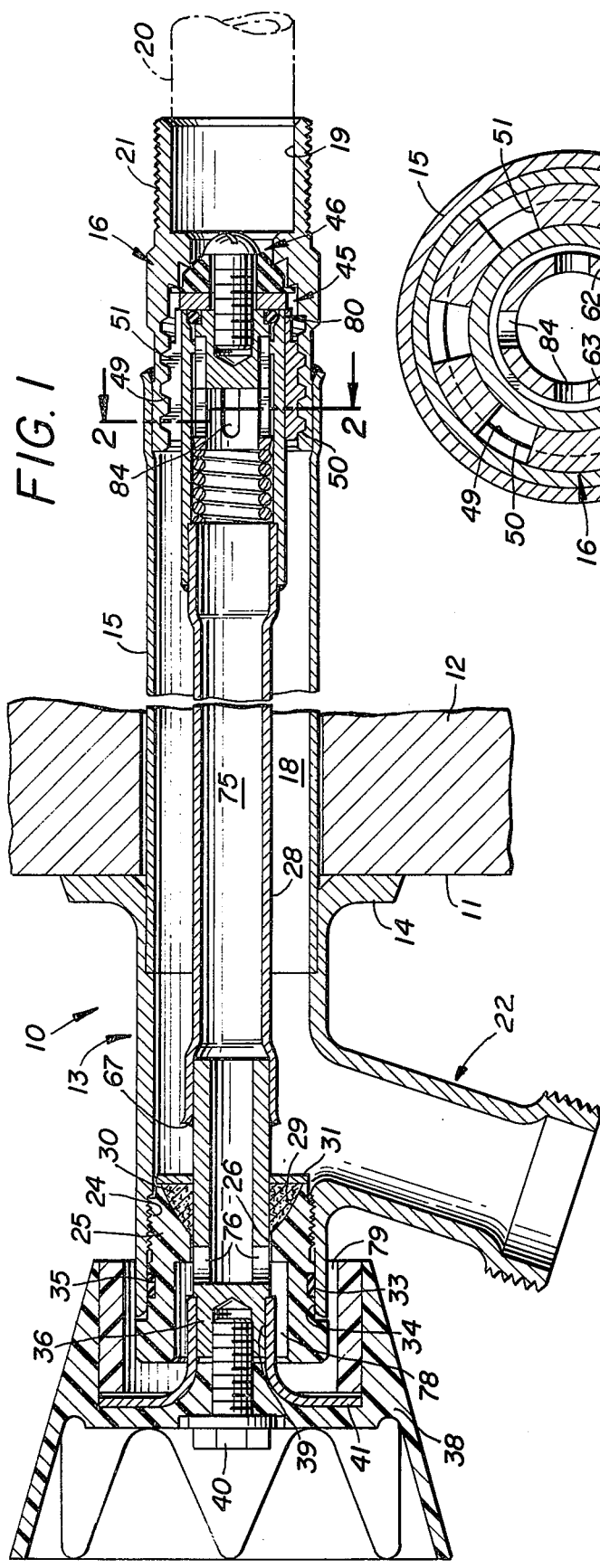
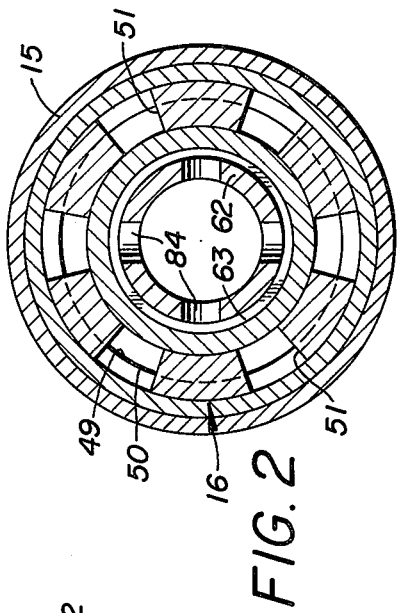
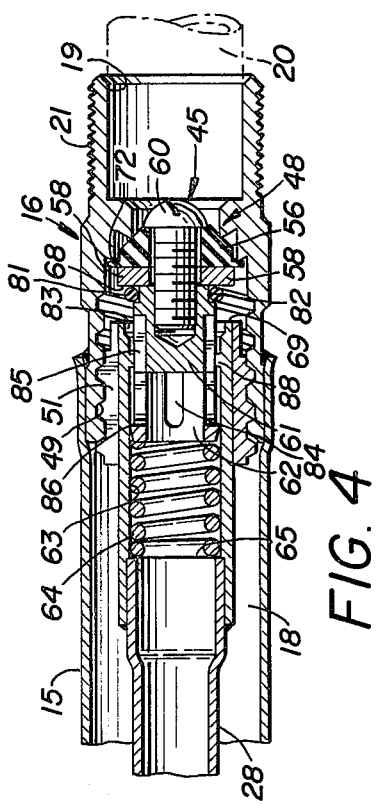
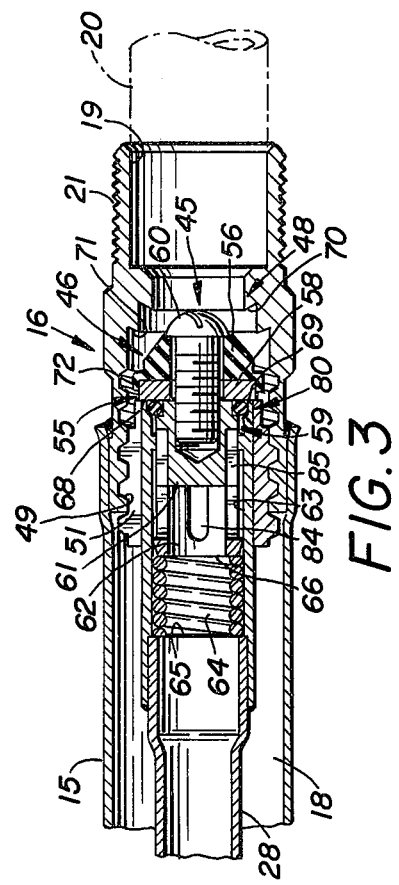

SILLCOCK INCORPORATING AN ANTISIPHON AND BACKFLOW PREVENTER

BACKGROUND OF THE INVENTION

The subject invention relates to an improved sillcock, and specifically one which eliminates the necessity for employing an extra inside stop valve to avoid bursting the faucet when it is subjected to freezing weather conditions. In addition, the improved sillcock to which the subject invention is directed also incorporates a siphon break and a backflow preventer. The mechanism by which backflow prevention is achieved presents the valve element in such a way that the sillcock can be opened and closed without employing any deleterious relative rotation between the elastomeric valve element and its seat.

The primary advantage of employing a backflow preventer in conjunction with a sillcock is to prevent the reverse flow of contaminated fluid through the sillcock and into its supply line. The problem is epitomized by the situation where one has the upstream end of a garden hose attached to a sillcock and is using the hose to file a container (e.g., a swimming pool, a garden spray can or a pet's drinking dish) with water. Imagine that the downstream end of the graden hose is immersed in the liquid within the container and that for some reason the pressure in the water line on the upstream side of the sillcock drops to zero. Flow through the garden hose would now be reversed and the contaminated liquid in which the downstream of the hose was immersed would flow, or be siphoned, through the sillcock into the water supply line.

The prior art is familiar with certain rudimentary arrangements intended to obviate backflow. For example, check valves have been interposed between the sillcock and any device attached thereto. However, no known arrangement is known by which back pressure would be released. Continuing the example of a garden hose connected to the sillcock, imagine that a typical spray nozzle is secured to the downstream end of the hose and that the spray nozzle is turned off, but the sillcock remains open. A check valve interposed between the sillcock and the hose will prevent backflow should the line pressure drop upstream with respect to the sillcock. However, with the check valve preventing reverse flow the pressure of the water within the garden hose will not be automatically relieved and the hose will "balloon," particularly if the hose is heated by the sun.

Moreover, the rudimentary prior art approach toward the prevention of backflow has not obviated the necessity of employing an additional stop valve upstream with respect to the sillcock in order to preclude damage to the sillcock occasioned by freezing temperatures. There are, of course, prior art sillcocks which are "frost-free," but the majority of those have been too cumbersome and expensive for other than commercial or institutional use and, in addition, their installation generally requires that more than one hole be drilled through the wall on which they are to be mounted. Generally, the flow pipe to which the nozzle is attached must be inserted from outside the building through one hole in the wall of the building on which it is to be mounted, and the flow control valve must be secured to the flow pipe from inside the building with the flow control valve stem extending through a second hole. This arrangement is quite obviously difficult to install, and in any event it does not possess a siphon break or a backflow preventor.

Another major problem inherent to prior art sillcocks is that the mechanism by which the sillcock is opened and closed produces a wear characteristic which is the most notorious single cause of gasket, or valve element, failure in the sillcock. This is because the operating mechanism utilized in prior art sillcocks imparts a relative rotational movement between the resilient gasket and its seat as the two elements engage and disengage, thereby causing undue wear to the valve gasket.

To date the prior art has been unable to develop an improved sillcock that will overcome all of the foregoing problems.

SUMMARY OF THE INVENTION

It is a primary object of the present invention to provide an improved sillcock which incorporates a mechanism adapted to prevent backflow in response to a pressure drop within the fluid supply line upstream with respect to the sillcock.

It is a further object of the present invention to provide an improved sillcock, as above, that incorporates a mechanism adapted to release any backpressure applied down-stream with respect to the sillcock upon actuation of the backflow preventer and also serve as a siphon break.

It is a still further object of the present invention to provide an improved sillcock, as above, which has a frost-proof characteristic such that no winterizing of the sillcock is necessary.

It is an even further object of the present invention to provide an improved sillcock, as above, in which wear to the gasket, or valve element, is greatly reduced by virtue of eliminating relative rotation between the gasket and the seat against which it operates.

It is another object of the present invention to provide an improved sillcock, as above, that can be installed with facility by simply drilling one hole through a wall of the structure, or building, on which it is to be mounted, inserting the sillcock through the hole and connecting the sillcock to the fluid supply line within the structure.

It is yet another object of the present invention to provide an improved sillcock, as above, that is relatively uncomplicated and economical to manufacture and maintain.

These and other objects of the present invention, together with the advantages thereof over existing prior art forms, which will become apparent from the description to follow are accomplished by means hereinafter described and claimed.

In general, an improved sillcock embodying the concept of the present invention employs a barrel having a first passageway extending axially therethrough. One end of the barrel is connected to a fluid supply line, and a spout communicates with the first passageway in proximity to the other end of the barrel. The valving mechanism of the sillcock is positioned within the barrel in proximity to the connection between the barrel and the fluid supply line. As such, if the barrel is of sufficient axial extent, and even though the nozzle is located exteriorly of the building on which the sillcock is mounted, the valving mechanism of the sillcock may be positioned within the building so that the fluid being supplied to the sillcock will not be exposed to the ambient temperature outside the building so long as the valving mechanism is closed.

The valving mechanism employs a valve seat which circumscribes the first passageway within the barrel. A preferably elastomeric valve element is movable into and out of engagement with the valve seat to control flow through the sillcock. Selective opening and closing of the sillcock is manually effected by a handle located at the axially outermost extent of the sillcock, and the handle is secured to a valve stem which extends axially within the barrel to present the elastomeric valve element.

In order to effect axial movement of the valve stem in response to rotation of the handle, thread means secured to the valve stem intermesh with corresponding thread means within the barrel. Should one elect to position a thread means between the fluid supply line and the nozzle, as will be shown in the preferred embodiment, the thread means may be fluted to maintain the integrity of the first passageway.

A backflow preventer is incorporated into the means by which the valve element is connected to the valve stem, and in the preferred form the valve element is carried on a piston that is slidably received within the axially innermost end of the valve stem. Pressure of the fluid within the supply line maintains the piston retracted within the valve stem against the biasing action of a spring means. When the pressure within the fluid supply line drops below a predetermined value the spring means biases the piston axially outwardly with respect to the valve stem. In this protracted position the piston forces the valve element into sealing engagement with the valve seat and thereby precludes reverse flow through the sillcock into the fluid supply line. It should be noted that the stroke of the piston must be sufficient to insure sealing engagement of the valve element against the valve seat when the pressure in the fluid supply line drops below the value predetermined to actuate the backflow preventer even though the valving mechanism is in its fully open position.

In order to provide a siphon break and to relieve any pressure downstream with respect to the sillcock after activation of the backflow preventer in response to a pressure drop in the fluid supply line, a second passageway, which opens to atmosphere, extends axially within the valve stem. A second valve mechanism controls communication between the first and second passageway. The second valving mechanism opens in response to actuation of the backflow preventer in order to effect a siphon break and relieve any pressure downstream with respect to the backflow preventer.

In addition to being axially translatable the piston is preferably also rotatably received within the valve stem in order to minimize wear to the valve element as a result of opening and closing the sillcock.

One preferred embodiment of the subject improved sillcock is shown by way of example in the accompanying drawings without attempting to show all of the various forms and modifications in which the invention might be embodied, the invention being measured by the appended claims and not by the details of the specification.

DESCRIPTION OF THE DRAWINGS

FIG. 1 is a sectional view taken longitudinally of an improved sillcock embodying the concept of the present invention and depicting the components thereof disposed to effect selective closure of the sillcock against flow from the pressurized fluid supply line depicted in chain lines;

FIG. 2 is an enlarged transverse sectional view taken substantially on line 2—2 of FIG. 1;

FIG. 3 is a sectional view similar to a portion of FIG. 1 but depicting the components disposed to permit flow through the sillcock under the effect of the pressurized fluid supply line; and, FIG. 4 is a sectional view similar to FIG. 3 but depicting the components disposed to prevent backflow through the sillcock, to effect a siphon break and/or relieve any pressure downstream with respect to the sillcock, all in response to a pressure drop in the fluid supply line.

DESCRIPTION OF THE PREFERRED EMBODIMENT

An improved sillcock embodying the concept of the present invention is designated generally by the numeral 10 in the drawings and is depicted, FIG. 1, as being mounted on the exterior surface 11 of a wall 12. Specifically, the improved sillcock 10 has a standard nozzle portion 13, the axially inner end of which terminates in a transversly extending mounting flange 14.

A tubular barrel 15 is secured to an extends axially inwardly from the nozzle portion 13, and a tubular connector 16 is presented from the axially innermost end of the barrel. The hollow interior of the connector 16 communicates with the hollow interior of the barrel 15 to provide a first passageway 18 within the sillcock 10.

A counterbore 19 may be provided within the connector 16 by which to effect a sweat connection to a fluid supply line 20 (shown in chain line in FIG. 1). The exterior of the connector may also be provided with pipe threads 21 to permit a coupling connection between a fluid supply line and a connector 16.

The first passageway 18 communicates directly with the laterally directed spout 22 of the nozzle portion 13. The interior of the nozzle portion 13 outwardly of the spout 22, and aligned with the first passageway 18, is provided with female threads 24 into which a stuffing nut 25 is threadably received. A bore 26 extends axially through the stuffing nut 25 and rotatably receives a valve stem 28. The axially inner end of the bore 26 terminates in a conically tapered engaging surface 29. A packing plug 30 is compressible between the engaging surface 29 and a packing ring 31 slidably carried on the valve stem 28. Selectively tightening the stuffing nut 25 to compress the packing plug 30 effects a liquid tight seal along the valve stem 28 and yet permits the valve stem 28 to rotate, or otherwise move, with respect to the barrel 15.

A liquid tight seal is also required between the stuffing nut 25 and the nozzle portion 13 within which it is received. This may be achieved by compressing on O-ring, or other annular stuffing means, 33 between the smooth, radially inner cylindrical surface 34 of the nozzle portion 13 and an annular recess 35 in the radially outer surface of the stuffing nut 25.

That end portion 36 of the valve stem 28 which protrudes axially outwardly of the bore 26 is non-rotatably secured to a handle 38. The end portion 36 may, as depicted, be squared to be received within a corresponding recess 39 in the handle 38, and a cap screw 40, or the like, may extend axially through the handle and be anchored in the end portion 36 to secure the handle 38 to the valve stem 28. When the handle 38 is made of plastic, or similar, material it may be desirable to incorporate the recess 39 within a metallic spider 41 molded into the handle 38, as shown.

The valving mechanism, indicated generally by the numeral 45, has a valving element 46 that is movable into and out of engagement with the valve seat 48 to open and close the improved sillcock 10. Axially inward displacement of the valve stem 28 moves the valving element 46 — against the pressure of the fluid within the supply line 20 — into sealing engagement with the valve seat 48 to close the sillcock 10, and axially outward displacement of the valve stem 28 permits the valving element 46 to be moved out of sealing engagement with the valve seat 48 by virtue of the pressure of the fluid within the supply line 20.

In order to effect the axial displacement of the valve stem 28 necessary to open and close the sillcock 10 in response to rotation of the handle 38, the interior of the tubular barrel 15, and/or the connector 16, may be provided with threads 49 that are meshingly engaged by corresponding threads 50 secured to the valve stem 28. By locating the threads 49 adjacent the valve seat 48, the valve stem 28 is supported in a most stable manner between the axially displaced threads 49 and the axial bore 26 through stuffing nut 25.

It should also be appreciated that by locating the meshingly engaged threads 49 and 50 between the fluid supply line 20 and the spout 22 continuity to the first passageway 18 can be maintained by providing axial flutes 51 in at least one set of threads — as shown, axially oriented flutes 51 extend through the threads 50 at locations spaced circumferentially about the valve stem 28.

As will be readily observed by reference to the drawings, the valving element 46 is not mounted to move only with the valve stem 28. In addition, the valving element 46 is mounted to move with respect to the valve stem 28. The valving element 46 and the structural arrangement by which it moves with, and with respect to, the valve stem 28 comprises the backflow preventer 55.

In the preferred embodiment depicted, the valving element 46 comprises an elastomeric body portion 56 that is secured to the head portion 58 of a piston 59, as by a cap screw 60. The body and skirt portions 61 and 62, respectively, of the piston 59 are received within a cavity 63 at the axially inner end of the valve stem 28 to permit the piston 59 to slide axially with respect to the valve stem 28 between a retracted position, as depicted in FIG. 3, and a protracted position, as depicted in FIG. 4.

A spring 64, such as the helical compression spring depicted, is also received within the cavity 63 and acts between a ledge 65 defining the axially innermost extent of the cavity 63 and the peripheral edge 66 of the skirt portion 62 continually to bias the piston 59 toward the protracted position represented in FIG. 4.

At the juncture between the body and the head portion 61 and 58, respectively, of the piston 59, the head portion 58 extends radially outwardly of the body portion 61 to present a stop surface 68 that is engageable by the axially innermost edge 69 of the valve stem 28 to delineate the maximum extent to which the piston 59 can be retracted within the valve stem 28. Rotation of the handle 38 to displace the valve stem 28 to its axially innermost position drives the innermost edge 69 of the valve stem 28 against the stop surface 68 on the piston 59 to force the valving element 46 into sealing engagement with the valve seat 48 and thereby close the sillcock 10 against the pressure of the fluid within the supply line 20, as is represented by the disposition of the elements shown in FIG. 1.

Counter rotation of the handle 38 to displace the valve stem 28 toward its axially outermost position allows the pressure of the fluid within the supply line 20 to overcome the biasing action of the spring 64 and maintain the piston 59 in its retracted position, thereby disengaging the valving element 46 from the valve seat 48 to open the sillcock 10 and permit the fluid within the supply line 20 to flow between the valve element 46 and valve seat 48, through flutes 51, along the first passageway 18 and out spout 22. FIG. 3 depicts the disposition of the elements within the sillcock in this "open" position.

So long as the pressure within the fluid supply line 20 remains above a predetermined value, the sillcock will remain open until manually closed by rotation of the handle 38. However, as soon as the pressure within the supply line drops below a predetermined value the biasing force applied by spring 64 will drive the piston 59 axially with respect to the valve stem 28 and bring the valving element 46 into sealing engagement with the valve seat 48 to preclude reverse flow through the sillcock and into the fluid supply line — thus effecting backflow prevention, as depicted in FIG. 4.

In order for the backflow preventer to function, the throw of the piston 59 must be sufficient to permit the valving element 46 sealingly to engage the valve seat 48 even when the valve stem 28 is displaced to its axially outermost position. This requires a means to control the axially outward displacement of the valve stem, and that result is achieved by fixedly locating a limit stop 67 on the valve stem 28 which engages the packing ring 31 to delineate the axially outermost extent to which the valve stem 28 can be normally displaced.

In order to enhance the seal between the valving element 46 and the valve seat 48 it has been found highly desirable to employ a valve seat comprising a pair of annular, axially displaced, concentric shoulders 70 and 71. The body portion 56 of the valving element 46 is adapted sealingly to engage the radially, and axially, inner shoulder 70.

A flexible skirt 72 extends radially outwardly of the body portion 56. The skirt 72 will fold back along the head portion 58 of piston 59 as the fluid from the supply line 20 flows through the sillcock 10 (as shown in FIG. 3), but when the pressure in supply line 20 drops below a predetermined value and the body portion 56 of the valving element 46 engages the inner shoulder 70 of valve seat 48, the skirt 72 will assume its radially oriented disposition and engage the radially, and axially, outer shoulder 71. So positioned, any pressure within the first passageway 18 will act against the skirt 72 to compound the effectiveness by which the valving element 46 seals against the valve seat 48 to preclude backflow.

The improved sillcock also incorporates a unique siphon break that operates in conjunction with the backflow preventer 55. In the preferred embodiment of the sillcock 10 depicted in the drawings a second passageway 75 extends axially within the valve stem 28 and opens to atmosphere via the radially directed ports 76 adjacent the end portion 36 of the valve stem 28. To facilitate communication between the ports 76 and atmosphere, a counterbore 78 is preferably provided within the stuffing nut 25. The axial extent of the counterbore 78 must be sufficient to establish communication with the ports 76 even when the stuffing nut 25 is screwed into the nozzle portion 13 to the minimum depth that might reasonably be anticipated — as when the sillcock is fitted with a new stuffing plug 30. The counterbore 78 itself communicates with atmosphere through a clearance gap 79 provided between the handle 38, the stuffing plug 25 and the nozzle portion 13.

A second valving mechanism 80 controls communication between the first and second passageway 18 and 75, respectively, in response to actuation of the backflow preventer. Specifically, a second valving element 81 is interposed between the head portion 58 of the piston 59 and the axially innermost edge 69 of the valve stem 28. The second valving element 81 may conveniently comprise and O-ring received within an annular notch 82 recessed into the body portion 61 of the piston 59 adjacent the stop surface 68 on head portion 58. To minimize wear on the second valving element 81 the radially inner portion of the edge 69 on valve stem 28 may be coved, as at 83, to provide a conforming surface against which the valving element may be compressed to effect a seal.

A plurality of circumferentially spaced apertures 84 penetrate the skirt portion 62 of the piston 59 and each aperture opens into a slot 85 that extends axially along the body portion 61 of the piston 59.

So long as the piston 59 is in its retracted position the second valving mechanism 80 precludes communication between the first and second passageways. However, when the piston 59 is protracted by the biasing force of spring 64 the first and second passageways 18 and 75, respectively, communicate past the second valving mechanism 80, along the slots 85 and through the apertures 84. As such, any fluid that remains under pressure within the first passageway 18 when the backflow preventer 55 closes the first valving mechanism 45 will be immediately discharged to atmosphere through the second passageway 75. Similarly, communication of the first passageway 18 to atmosphere established through the second passageway 75 disrupts the continuity of the fluid column in the first passageway 18, thereby effectively acting to obviate any siphoning effect.

To achieve backflow prevention as well as a siphon break, the piston 59 is mounted within the valve stem 28 for relative axial movement. It is also preferred that the piston 59 be mounted for relative rotational movement. That is, it is preferred that the recess 63 be cylindrical and that the body and skirt portions 61 and 62 of the piston 59 also be cylindrical to permit the piston 59 and the valve stem 28 to be relatively rotatable. In that way even though the valve stem 28 rotates when one turns the handle 38 manually to open and close the sillcock, the valve element 46 will rotate only during that time that its contact with the valve seat 48 does not create sufficient friction to resist rotation. So long as frictional contact is maintained the valving element 46 will translate with respect to the valve seat 48 without deleterious relative rotation therebetween.

Finally, it should now be appreciated that upon removal of the stuffing nut 25 the valve stem 28 can be rotated to remove the internal mechanism of the sillcock with considerable facility; an immeasurable advantage when replacing old valving elements, or other parts. As shown, the maximum extent to which the piston can be protracted with respect to the valve stem 28 may be controlled by providing a radially outwardly extending nib 86 around the peripheral edge of the skirt 62 on piston 59 that is engageable with a radially inwardly extending, annular retaining ring 88 presented from the wall of the recess 63.

An improved sillcock embodying the concept of the present invention can be installed simply by drilling one hole in the wall through which the sillcock is to be mounted. The hole need merely be of sufficient size to permit insertion of the barrel 15 but should be drilled at a slightly inclined angle with respect to a horizontal frame of reference in order to permit complete drainage of the passageway 18 through spout 22 after the sillcock has been closed.

It should now be apparent that a sillcock embodying the concept of the present invention is frost-proof, prevents backflow, incorporates a siphon break and otherwise accomplishes the objects of the invention.

We claim:

1. A sillcock comprising; a barrel having an axially inner and an axially outer end portion; a first passageway extending through said barrel; connector means at the axially inner end portion of said barrel adapted for securing said barrel to a pressurized fluid supply line; a spout communicating with said first passageway; a valve stem having axially inner and axially outer end portions and extending axially within said first passageway; a second passageway extending through said valve stem opening to the atmosphere; a handle secured to the axially outer end portion of said valve stem for selectively displacing said valve stem axially between an open and a closed position while permitting said second passageway to communicate to the atmosphere; a valve seat circumscribing said first passageway within said barrel and disposed between said connector means and said spout; a piston mounted within the axially inner end portion of said valve stem so as to be movable axially between a retracted and protracted position with respect to said valve stem; a valving element mounted on said piston in opposition to said valve seat; means on said valve stem to engage said piston in its retracted position and maintain said valve element in sealing engagement with said valve seat when said valve stem is in closed position; and, biasing means acting between said valve stem and said piston continuously to urge said piston toward its protracted position to maintain said valve element in sealing engagement with said valve seat throughout the range of axial movement available to said valve stem between said open and closed positions when the pressure within said fluid supply line falls below a predetermined value thereby preventing backflow and simultaneously permiting communication between said first passageway and said second passageway to release backpressure present to the atmosphere through said second passageway.

2. A sillcock, as set forth in claim 1, in which said barrel and said valve stem are of sufficient axial extent that when said spout is positioned in proximity to the exterior wall of a building said valve seat is located interiorily of the building.

3. A sillcock, as set forth in claim 1, in which said valve seat comprises at least first and second axially displaced, concentric shoulders and said first valve element comprises an elastomeric body portion engaging said first shoulder and an annular, radially extending, flexible skirt engaging said second shoulder sealingly to close said first passageway.

4. A sillcock, as set forth in claim 1, said valve stem further comprising threads meshingly to engage a corresponding set of threads presented in opposition thereto from the interior of said barrel, said handle being rotatable to displace said valve stem axially with respect to said barrel by virtue of the engagement of said threads, at least one set of said threads being fluted to permit said first passageway to communicate through said meshingly engaged threads.

5. A sillcock, as set forth in claim 4, in which said piston is mounted for rotational as well as axial movement with respect to said valve stem.

6. A sillcock, as set forth in claim 1, further comprising a second valving element located down stream with respect to said first valve element to permit selective communication between said first and said second passageway, and actuated by said biasing means.

7. A sillcock, as set forth in claim 6, in which said second valve element is also supported on said piston, said second valve element closing communication between said first and second passageways when said piston is in its retracted position and opening communication between said first and second passageways when said piston is in its protracted position by action of said biasing means against a fluid line supply pressure of a predetermined value.

8. An improved sillcock comprising: a spout; a barrel having a first passageway communicating with said spout; means on said barrel opposite said spout for connecting said barrel to a fluid supply line; said barrel being of sufficient length to extend from said spout when it is mounted exteriorily of a building to a fluid supply line located within the building; a first valving mechanism mounted within said barrel, and in proximity to the fluid supply line, to control the flow of fluid through the sillcock; a valve stem extending axially within said barrel, connected to said first valving mechanism, to effect manual actuation of said first valving mechanism; a second passageway extending axially within said valve stem which opens to the atmosphere; a second valving mechanism to control communication between said first and said second passageways; and, means acting between said valve stem and said first and said second valving mechanisms to actuate said first and said second valving mechanisms in response to the pressure within the fluid supply line so as to prevent flow into the fluid supply line and relieve back pressure present to the atmosphere.

\* \* \* \* \*